United States Patent
Hayashi

(10) Patent No.: US 9,531,901 B2
(45) Date of Patent: Dec. 27, 2016

(54) IMAGE PROCESSING APPARATUS, IMAGE PROCESSING METHOD, AND NON-TRANSITORY COMPUTER READABLE MEDIUM

(71) Applicant: FUJI XEROX CO., LTD., Minato-ku, Tokyo (JP)

(72) Inventor: Mitsuo Hayashi, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 156 days.

(21) Appl. No.: 13/867,635

(22) Filed: Apr. 22, 2013

(65) Prior Publication Data

US 2014/0063539 A1 Mar. 6, 2014

(30) Foreign Application Priority Data

Aug. 29, 2012 (JP) ................................ 2012-188863

(51) Int. Cl.
*G06F 15/00* (2006.01)
*H04N 1/00* (2006.01)

(52) U.S. Cl.
CPC ...... *H04N 1/00954* (2013.01); *H04N 1/00278* (2013.01); *H04N 1/00408* (2013.01); *H04N 1/00474* (2013.01); *H04N 1/00411* (2013.01); *H04N 2201/0094* (2013.01)

(58) Field of Classification Search
None
See application file for complete search history.

(56) References Cited

U.S. PATENT DOCUMENTS

| 7,973,948 | B2 | 7/2011 | Jordan et al. |
| 8,243,311 | B2* | 8/2012 | Yoshimura .................. 358/1.15 |
| 2002/0048044 | A1* | 4/2002 | Kida ........................... 358/1.15 |
| 2003/0214684 | A1* | 11/2003 | Kuboki ............. H04N 1/00384 |
| | | | 358/474 |
| 2005/0128527 | A1 | 6/2005 | Brawn et al. |
| 2007/0121159 | A1 | 5/2007 | Jordan et al. |

(Continued)

FOREIGN PATENT DOCUMENTS

| JP | 11-017909 A | 1/1999 |
| JP | 2002-204323 A | 7/2002 |

(Continued)

OTHER PUBLICATIONS

Communication dated Dec. 5, 2014 from the Australian Patent Office in counterpart application No. 2013205408.

(Continued)

*Primary Examiner* — Helen Q Zong
(74) *Attorney, Agent, or Firm* — Sughrue Mion, PLLC

(57) ABSTRACT

An image processing apparatus includes a first accepting unit, a controller, and a second accepting unit. The first accepting unit accepts a first operation from an operator to specify a process to be performed on an image of a paper, which is to be read, from among multiple processes before accepting a starting instruction from the operator. The controller controls, in a case where the starting instruction is accepted before the first operation is accepted, an image reading unit to perform an image reading process on the image of the paper. The second accepting unit accepts, after the image reading process is started, a second operation from the operator to specify a process to be performed on the image from among the multiple processes.

8 Claims, 11 Drawing Sheets

(56) References Cited

U.S. PATENT DOCUMENTS

| | | | |
|---|---|---|---|
| 2008/0278748 A1* | 11/2008 | Akahane et al. | 358/1.15 |
| 2010/0027058 A1* | 2/2010 | Okada | H04N 1/00209 |
| | | | 358/1.15 |
| 2010/0287490 A1 | 11/2010 | Ichimi | |
| 2012/0274665 A1* | 11/2012 | Shimizu | G06F 3/0485 |
| | | | 345/684 |
| 2013/0033718 A1* | 2/2013 | Tsujimoto | H04N 1/00482 |
| | | | 358/1.13 |

FOREIGN PATENT DOCUMENTS

| | | |
|---|---|---|
| JP | 2004-48659 A | 2/2004 |
| JP | 2007-251326 A | 9/2007 |
| JP | 2010-262501 A | 11/2010 |
| JP | 2012-49894 A | 3/2012 |
| KR | 10-2007-0077133 A | 7/2007 |
| WO | 95/30958 A1 | 11/1995 |

OTHER PUBLICATIONS

Communication dated Mar. 4, 2015 from the Intellectual Property Office of Australia in counterpart Application No. 2013205408.
Office Action (Patent Examination Report) dated Jun. 30, 2015, issued by the Australian Patent Office in counterpart Australian Application No. 2013205408.
Communication dated Mar. 15, 2016 from the Japanese Patent Office issued in corresponding Application No. 2012-188863.
Communication dated Aug. 25, 2016 from the Korean Intellectual Property Office in counterpart application No. 10-2013-0058838.

* cited by examiner

FIG. 2

| ╭210 | ╭220 | ╭230 | ╭240 | 200 |
|---|---|---|---|---|
| DOCUMENT ID | DOCUMENT NAME | THUMBNAIL IMAGE | IMAGE | |
| | | | | |

FIG. 3

| ╭310 | ╭320 | ╭330 | ╭340 | | 300 |
|---|---|---|---|---|---|
| DOCUMENT GROUP ID | NUMBER OF DOCUMENTS | DOCUMENT ID (1) | DOCUMENT ID (2) | ... | |
| | | | | | |

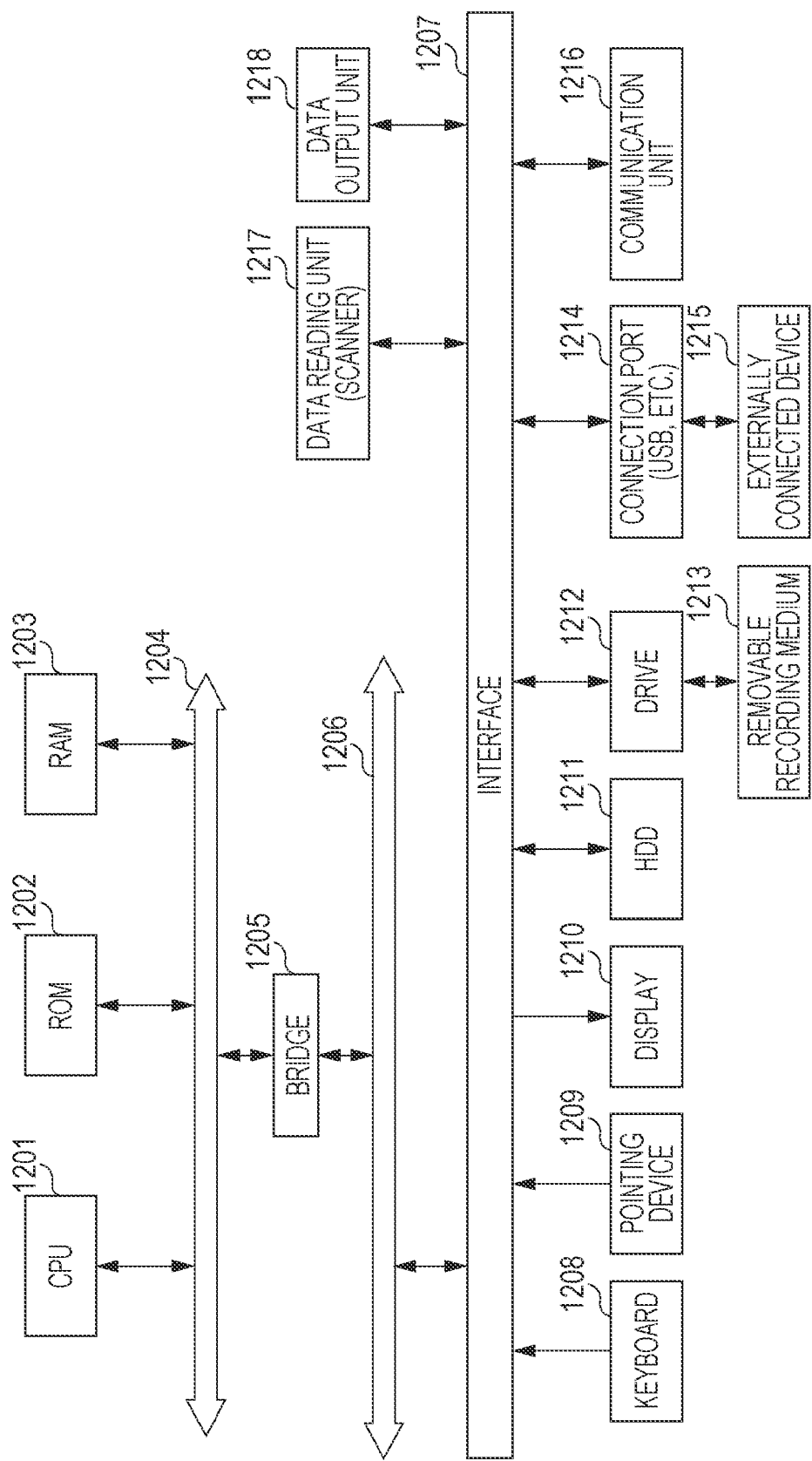

IMAGE PROCESSING APPARATUS, IMAGE PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-188863 filed Aug. 29, 2012.

BACKGROUND

Technical Field

The present invention relates to an image processing apparatus, an image processing method, and a non-transitory computer readable medium.

SUMMARY

According to an aspect of the invention, there is provided an image processing apparatus including a first accepting unit, a controller, and a second accepting unit. The first accepting unit accepts a first operation from an operator to specify a process to be performed on an image of a paper, which is to be read, from among multiple processes before accepting a starting instruction from the operator. The controller controls, in a case where the starting instruction is accepted before the first operation is accepted, an image reading unit to perform an image reading process on the image of the paper. The second accepting unit accepts, after the image reading process is started, a second operation from the operator to specify a process to be performed on the image from among the multiple processes.

BRIEF DESCRIPTION OF THE DRAWINGS

An exemplary embodiment of the present invention will be described in detail based on the following figures, wherein:

FIG. 2 illustrates an example of the data structure of a document table;

FIG. 3 illustrates an example of the data structure of a document group table;

FIG. 12 is a block diagram illustrating an example of a hardware configuration of a computer that implements the exemplary embodiment.

DETAILED DESCRIPTION

An exemplary embodiment for carrying out the present invention will be displayed below with reference to the accompanying drawings.

Figure 1:
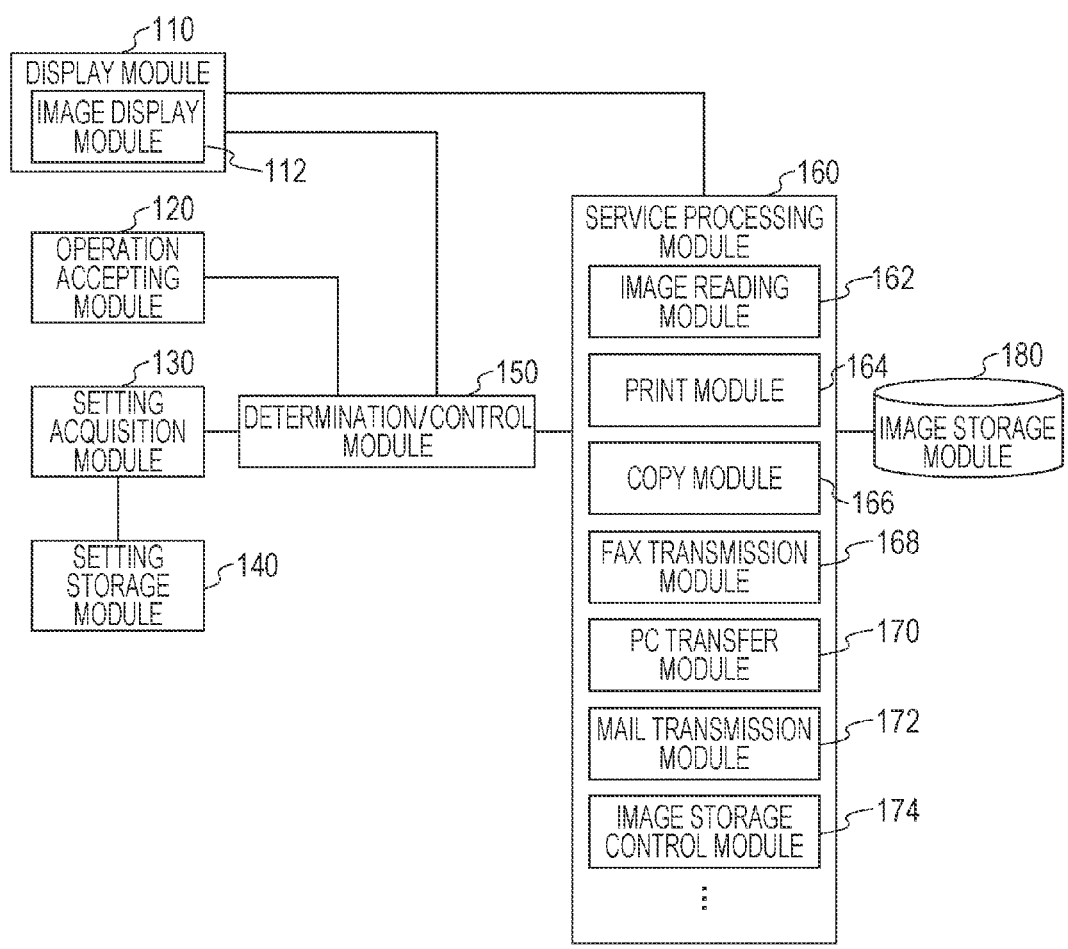
FIG. 1 illustrates an example of the conceptual module configuration according to an exemplary embodiment.

FIG. 1 illustrates an example of the conceptual module configuration according to an exemplary embodiment.

In general, the term "module" indicates a logically separable component, such as a software component (a computer program) or a hardware component. Thus, the term "module" used in this exemplary embodiment indicates not only a module in a computer program but also a module in a hardware configuration. For this reason, the exemplary embodiment includes description regarding a computer program causing a computer to function as the modules (such as a program causing a computer to execute each procedure, a program causing a computer to function as each unit, or a program causing a computer to implement each function), a system, and a method. For ease of explanation, the expressions "to store" and "to cause a device to store" and expressions equivalent thereto are used. When the exemplary embodiment is implemented as a computer program, these expressions indicate that the computer program causes a storage device to store information or the computer program performs control to cause a storage device to store information. Also, modules and functions may have one-to-one correspondences; however in implementations, one module may be constituted by one program, plural modules may be constituted by one program, or conversely one module may be constituted by plural programs. In addition, plural modules may be executed by one computer or one module may be executed by plural computers in a distributed or parallel environment. Moreover, one module may include another module. Hereinafter, the term "connection" is used to refer to physical connection and logical connection (such as data exchange or reference relations between instructions and between pieces of data). Further, the term "predetermined" indicates a state where something is decided prior to target processing. The term "predetermined" includes the meaning that something is decided in accordance with a state/status at that time or a state/status up to that point before and even after a process according to an exemplary embodiment starts as long as the decision is made prior to the target processing. In the case where plural "predetermined values" are used, the plural "predetermined values" may be different from each other or two or more values (which obviously include all values) may be the same. Moreover, the expression "if something is A, B is performed" is used to indicate that "it is determined whether or not something is A, and then B is performed if it is determined that something is A", except for the case where determination regarding whether or not something is A is not needed.

In addition, a system or an apparatus may be constituted by plural computers, plural hardware components, plural devices, or the like that are connected to each other via communication lines, such as networks (including one-to-one communication connections), or may be constituted by one computer, one hardware component, one device, or the like. The terms "apparatus" and "system" are used as synonyms to each other. Obviously, the "system" does not include a social "mechanism" (social system) that is an arrangement made by humans.

In each process performed by each module or in each of plural processes performed by a module, information is read from a storage device, the process is performed on the information, and the resulting information obtained from the process is written in the storage device. Thus, description regarding reading information from the storage device performed prior to the process and writing information in the storage device subsequent to the process is occasionally omitted. Here, examples of the storage device may include a hard disk drive (HDD), a random access memory (RAM), an external storage medium, a storage device connected via a communication line, and registers included in a central processing unit (CPU).

As illustrated in an example in FIG. 1, an image processing apparatus according to this exemplary embodiment includes a display module 110, an operation accepting module 120, a setting acquisition module 130, a setting storage module 140, a determination/control module 150, a service processing module 160, and an image storage module 180.

This image processing apparatus may be built into a multifunction peripheral (that is, an image processing apparatus having two or more functions of the scanner, the printer, the copier, the facsimile (fax) machine, and so forth) or may be an apparatus that is in a separate housing and controls the multifunction peripheral.

Also, this image processing apparatus is able to perform multiple processes on an image and includes at least an image reading module 162 (that is, a scanner). The multiple processes that the image processing apparatus is able to perform include one or more processes related to one or more functions (services) of printing performed by a print module 164 (that is, a printer), of copying performed by a copy module 166 (that is, a copier), of image transmission performed by a fax transmission module 168, of image transfer performed by a personal computer (PC) transfer module 170, of image-attached mail transmission performed by a mail transmission module 172, of image storage and deletion performed by an image storage control module 174, in addition to image reading function (service) provided by the image reading module 162.

The display module 110 is connected to the determination/control module 150 and the service processing module 160, and includes an image display module 112. The display module 110 displays, on a touch panel or the like, for example, a start button and function selection buttons with which an operation performed by an operator is accepted. The image display module 112 displays, on the touch panel or the like, images resulting from reading performed by the image reading module 162 and images or the like stored in the image storage module 180.

The operation accepting module 120 is connected to the determination/control module 150. The operation accepting module 120 accepts an operation performed by the operator to specify an instruction related to an image. For example, examples of the action "accepting an operation performed by the operator" includes "detecting that a start button included in a keyboard or displayed on a touch panel or the like has been pressed".

After an image reading process has been started under control of the determination/control module 150, the operation accepting module 120 accepts an operation performed by the operator to specify a process to be performed on the image from among plural processes. The operation performed by the operator at this time specifies a process to be performed on the image resulting from reading performed by the image reading module 162. Examples of the operation performed by the operator include pressing a button associated with a copy function or the like. This procedure will be described later with reference to a flowchart of FIG. 4.

Also, after the specified process has been started under control of the determination/control module 150, the operation accepting module 120 may accept an operation performed by the operator to specify another process to be performed on the image, from among processes that do not conflict with the process currently being performed by one or more modules included in the service processing module 160. For example, when the copy module 166 is currently performing a printing process, a process that does not conflict with the currently performed process may be a fax transmission process performed by the fax transmission module 168 or the like. In such a case, an operation specifying the fax transmission process is made acceptable. Conversely, a process that conflicts with the currently performed process may be a printing process performed by the copy module 166, when the copy module 166 is currently performing a printing process. In such a case, an operation for causing the copy module 166 to perform the process is made unacceptable. Because the print module 164 and the copy module 166 both use a printer, processes performed by the print module 164 and the copy module 166 are conflicting processes. This procedure will be described later with reference to a flowchart illustrated in FIG. 6.

In addition, the operation accepting module 120 may accept an operation performed by the operator to specify multiple processes to be performed on the image. Also, after an operation for specifying a process is performed, an image used to enter an instruction to start the process may be displayed on the screen. This procedure will be described later with reference to a flowchart illustrated in FIG. 8.

The operation accepting module 120 may accept an operation performed by the operator in which one of a process to be performed on an image and an image to be processed is specified first and thereafter the other is specified. That is, the operator may specify a process before specifying an image to be processed or may specify an image to be processed before specifying a process. This procedure will be described with reference to a flowchart illustrated in FIG. 11.

The setting storage module 140 is connected to the setting acquisition module 130. The setting storage module 140 stores functions set as a result of operations that have been accepted by the operation accepting module 120. That is, the setting storage module 140 stores a currently set function, functions that have been set before, a function that is set to be performed next, and so forth.

The setting acquisition module 130 is connected to the setting storage module 140 and the determination/control module 150. The setting acquisition module 130 stores a function set by the operation accepting module 120 in the setting storage module 140. The setting acquisition module 130 also reads out a function stored in the setting storage module 140 and supplies the obtained function to the determination/control module 150. For example, the setting acquisition module 130 may read out the currently set function from the setting storage module 140 and supply the currently set function to the determination/control module 150.

The determination/control module 150 is connected to the display module 110, the operation accepting module 120, the setting acquisition module 130, and the service processing module 160. In the case where a process starting instruction is accepted by the operation accepting module 120 before a process to be performed on an image is set, the determination/control module 150 controls the image reading module 162 to perform an image reading process. Here, "before a process to be performed on an image is set" indicates that this image processing apparatus is in the initial state and corresponds to a state in which a function, such as the copy function, has not been set. For example, this state is a state in which the original document is positioned but a function to be performed by this image processing apparatus has not been decided. "Accepting a process starting instruction" in this state indicates that the start button is pressed before a function is set. This control procedure will be described with reference to the flowchart illustrated in FIG. 4.

Also, the determination/control module 150 performs control so that one or more modules included in the service processing module 160 which are associated with an operation accepted by the operation accepting module 120 perform a process on the image. For example, associations between an operation accepted by the operation accepting module 120 and the one or more modules included in the service processing module 160 are as follows: an operation specifying the copy process is associated with the copy module 166, an operation specifying the fax transmission process is associated with the fax transmission module 168, an operation specifying the PC transfer process is associated with the PC transfer module 170, an operation specifying the mail transmission process is associated with the mail transmission module 172, an operation specifying the image storage process is associated with the image storage control module 174, and so forth. This control procedure will be described with reference to the flowchart illustrated in FIG. 6.

Also, in the case where a process starting instruction is accepted on one of screens on which multiple processes have been set, the determination/control module 150 performs control so that one or more modules included in the service processing module 160 perform, on an image, a process that has been set on the screen on which the process starting instruction is accepted. This control procedure will be described with reference to the flowchart illustrated in FIG. 8.

Furthermore, after a process performed by one or more modules included in the service processing module 160 has ended, the determination/control module 150 may store the image subjected to the process in the image storage module 180 or delete the image subjected to the process. This control procedure will be described with reference to the flowchart illustrated in FIG. 10.

The service processing module 160 is connected to the display module 110, the determination/control module 150, and the image storage module 180. The service processing module 160 includes the image reading module 162, the print module 164, the copy module 166, the fax transmission module 168, the PC transfer module 170, the mail transmission module 172, and the image storage control module 174. The service processing module 160 is constituted by modules having image-related functions in this image processing apparatus.

The image reading module 162 is a module that implements an image reading function by using a scanner.

The print module 164 is a module that implements an image printing function by using a printer.

The copy module 166 is a module that implements an image copy function by using a copier. This function may be implemented by reading an image using a scanner and then printing the image resulting from reading using a printer.

The fax transmission module 168 is a module that implements an image transmission function by using a fax machine.

The PC transfer module 170 is a module that implements a function of transmitting an image to a PC by using a communication device. For example, an image may be stored in a predetermined storage device included in the PC.

The mail transmission module 172 is a module that implements a function of transmitting an email attached with an image by using a communication device. For example, an email may be transmitted to a predetermined email address.

The image storage control module 174 is a module that implements a function of storing an image in the image storage module 180 and a function of reading out an image from the image storage module 180. Also, the image storage control module 174 may receive an image from another module and store the received image in the image storage module 180 and may supply an image read out from the image storage module 180 to another module.

The image storage module 180 is connected to the service processing module 160. The image storage module 180 stores images resulting from reading performed by the image reading module 162, images received by fax, to-be-printed images received by the print module 164, images stored by the image storage control module 174, and so forth. The image storage module 180 also supplies images stored therein to the print module 164, the copy module 166, the fax transmission module 168, and so forth.

The image storage module 180 manages images stored therein, for example, using a document table 200. FIG. 2 illustrates an example of the data structure of the document table 200. The document table 200 has a document identification (ID) field 210, a document name field 220, a thumbnail image field 230, and an image field 240. The document ID field 210 stores the document ID that is information with which a corresponding document image may be uniquely identified in this exemplary embodiment. The document name field 220 stores the name of the document image. The thumbnail image field 230 stores a reduced-size image (for example, a thumbnail image) of the document image. For example, the thumbnail image field 230 stores a location (for example, an address) where the reduced-size image is stored. Also, a reduced-size image is displayed on the touch panel or the like as an image that represents the document image. The image field 240 stores the document image. For example, the image field 240 stores a location where the document image is stored.

Also, the image storage module 180 manages groups of images stored therein, for example, using a document group table 300. A group of documents indicates a group constituted by plural individual images. For example, the page number may be assigned to images in the order in which the individual images are added to the group. FIG. 3 illustrates an example of the data structure of the document group table 300. The document group table 300 has a document group ID field 310, a number-of-documents field 320, a document ID (1) field 330, a document ID (2) field 340, and so forth. The document group ID field 310 stores the document group ID that is information with which a corresponding group of document images may be uniquely identified according to the exemplary embodiment. The number-of-documents field 320 stores the number of documents included in the group. The number-of-documents field 320 is followed by document ID fields, the number of which is equal to the number of documents and which include the document ID (1) field 330 and so forth. The document ID (1) field 330 stores the document ID of a document (the first page) included in the group. The document ID (2) field 340 stores the document ID of a document (the second page) included in the group.

Figure 4:
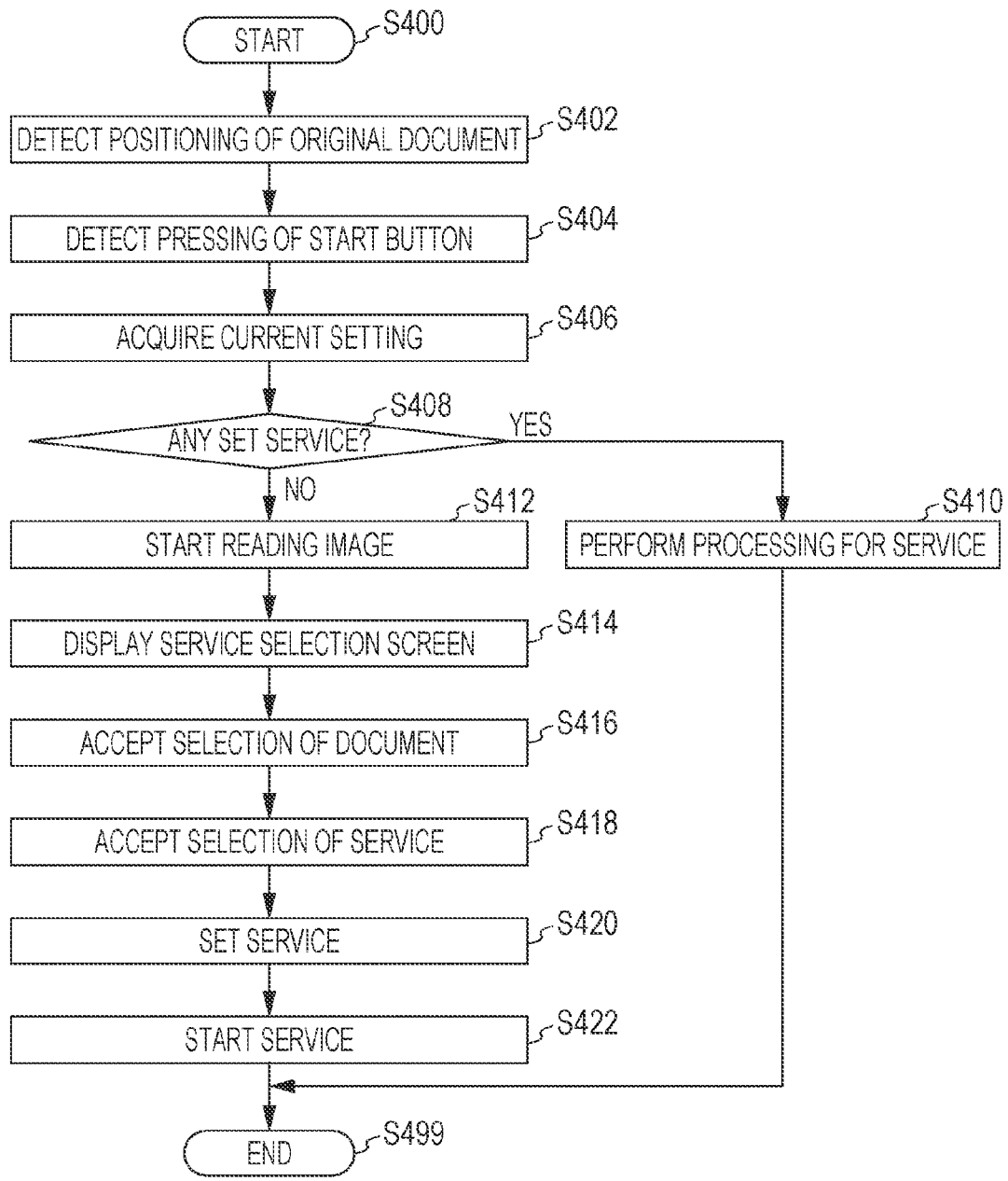
FIG. 4 is a flowchart illustrating an example of a procedure according to the exemplary embodiment.

FIG. 4 is a flowchart illustrating an example of a procedure according to the exemplary embodiment.

In step S402, the operation accepting module 120 detects that an original document has been positioned. For example, the operation accepting module 120 detects that an original document has been positioned on an original table (or a platen) of the image processing apparatus or that original documents have been positioned at an auto document feeder (ADF), which is a device that successively feeds plural original documents to the original table.

In step S404, the operation accepting module 120 accepts an operation of pressing the start button. As described before, the operation accepting module 120 detects that the start button displayed on the touch panel or the like has been pressed.

In step S406, the setting acquisition module 130 acquires a currently set service (including a process and a function) from the setting storage module 140.

In step S408, the determination/control module 150 determines whether or not a service has been set. If a service has been set, the process proceeds to step S410. Otherwise (that is, if no service has been set), the process proceeds to step S412.

In step S410, one or more corresponding modules included in the service processing module 160 perform a process based on the service.

In step S412, the image reading module 162 starts reading an image.

In step S414, the display module 110 displays a service selection screen. That is, after an image reading process is performed, the display module 110 allows the user to select a process to be performed on an image obtained as a result of the image reading process.

In step S416, the operation accepting module 120 accepts an operation of selecting a document.

In step S418, the operation accepting module 120 accepts an operation of selecting a service.

In step S420, the determination/control module 150 sets the service.

In step S422, the service processing module 160 starts the service.

Figure 5:
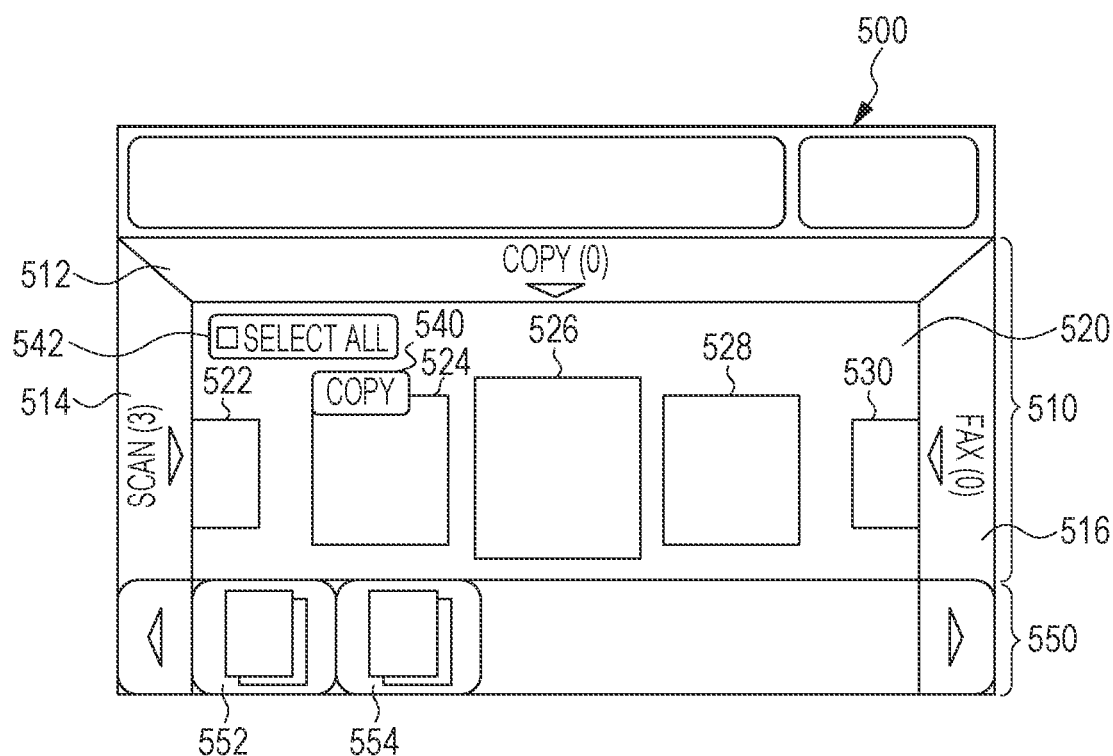
FIG. 5 illustrates an example of an operation screen displayed according to the exemplary embodiment.

For example, upon the user pressing the start button after positioning one original document on the original table, reading of the original document starts (step S412) and then the displayed screen changes to the preview screen (step S414). If the user wishes to use the original document in the copy service thereafter, the user selects a document image of the original document (step S416) and selects the copy service (step S418). In response to this, the displayed screen changes to the copy setting screen, on which the user changes settings if needed (step S420) and presses the start button to start the copy service (step S422). The service may be selected through a displayed menu or through a flick operation toward a displayed area for the copy service. For example, as illustrated in FIG. 5, in response to detection of selection of a document image 524, a menu of selectable services may be displayed so as to allow the user to select a service from the menu and the selected service may be displayed in a set service display area 540. Alternatively, by detecting an operation of selecting a document image 526 and moving the document image 526 to a copy service specification area 512, a service (copy) may be specified for the document image 526.

The menu may be displayed on the screen on which the document has been selected or the menu may be displayed in a popup manner in response to a multi-touch operation (such as a touch with two fingers), which is used as a trigger for displaying the menu, for example.

The preview screen has, for example, a graphical user interface (GUI) as illustrated in FIG. 5. The service is changeable to a given service. Examples of the method of changing the service include pressing and holding a service button, providing a change button, and performing a flick operation.

FIG. 5 illustrates an example of an operation screen 500 displayed according to this exemplary embodiment. The operation screen 500 includes an operation-preview area 510 and a document group display area 550. The operation-preview area 510 includes the copy service specification area 512, a scan service specification area 514, a fax service specification area 516, and a document image display area 520. The document image display area 520 displays a document image 522, the document image 524, the document image 526, a document image 528, and a document image 530. The document images 522 to 530 are thumbnail images each representing a corresponding one of images stored in the image storage module 180 or a corresponding one of images resulting from reading performed by the image reading module 162. The document image 524 is displayed together with the set service display area 540, which indicates that the service (copy) has already been set therefor. The copy service specification area 512 is provided in order to accept an operation of selecting all images. The document group display area 550 displays a document group 552 and a document group 554. These document groups each display documents that have been grouped.

Figure 6:
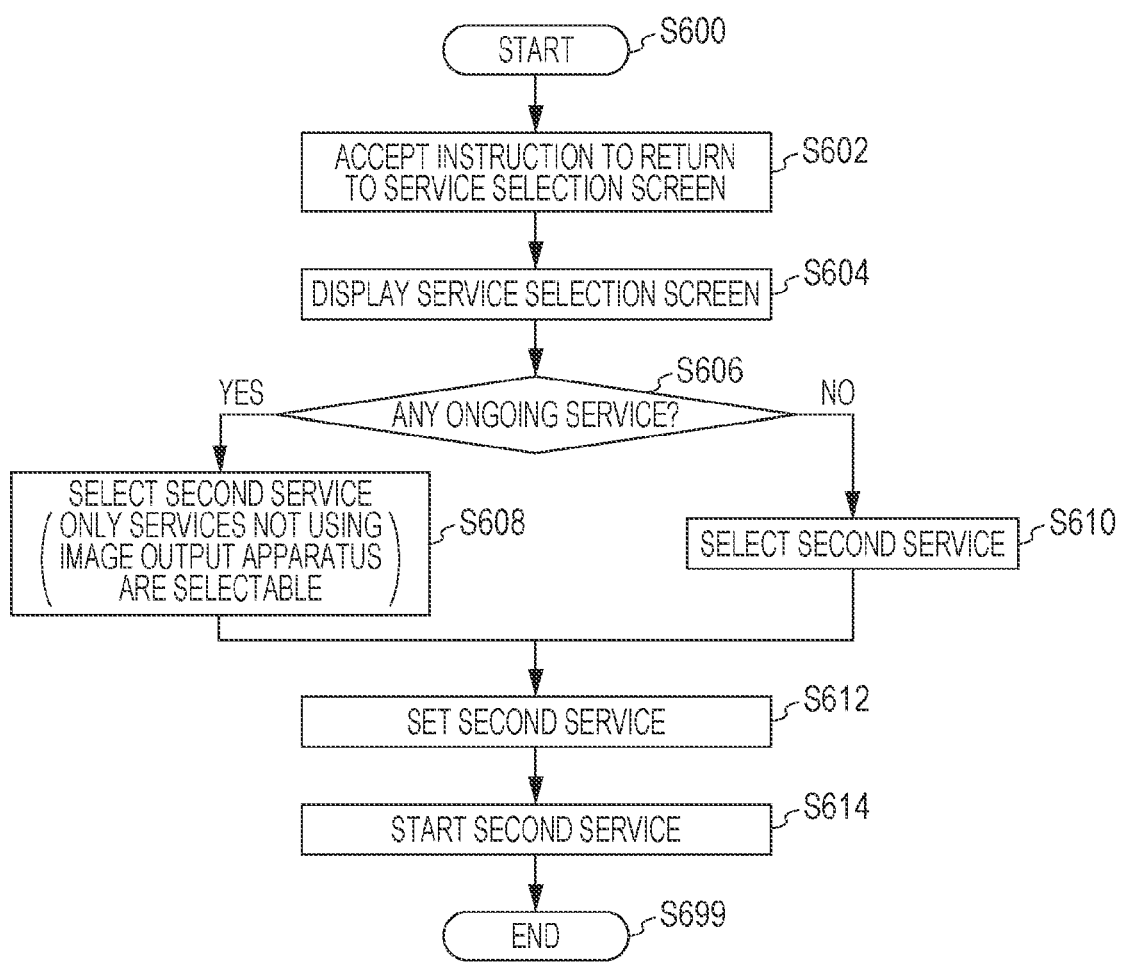
FIG. 6 is a flowchart illustrating an example of a procedure according to the exemplary embodiment.

FIG. 6 is a flowchart illustrating an example of a procedure according to the exemplary embodiment.

In step S602, the operation accepting module 120 accepts an instruction to return to the service selection screen.

In step S604, the display module 110 returns the displayed screen to the service selection screen.

In step S606, the determination/control module 150 determines whether or not the service is ongoing. If the service is ongoing, the process proceeds to step S608. Otherwise, the process proceeds to step S610.

In step S608, the determination/control module 150 selects a second service (from among services that do not use the image output device).

In step S610, the determination/control module 150 selects the second service.

In step S612, the determination/control module 150 sets the second service.

In step S614, the service processing module 160 starts the second service.

For example, the displayed screen may change to the preview screen (that is, the service selection screen) again upon the completion of the first service (steps S602 and S604). This is performed so as to handle the case where the user wishes to use the document used in the first service in another service (for example, the fax service). In this case, if the user selects the fax service, makes settings (such as one regarding the destination address), and presses the start button, the fax service is used without reading the original document again (NO in step S606).

Also, selection may be made so that another service is used while a process for a first service, that is, the copy service, is being performed on a document (or multiple documents) (during a processing period of the copy module 166). Selectable services are services that do not conflict with the process being performed by a processing device (for example, the image output device (that is, the printer)).

For example, during copying, fax transmission (the fax transmission module 168), PC transfer (the PC transfer module 170), and mail transmission (the mail transmission module 172) may be used. If the user selects to use another service while one service is being performed (YES in step S606), the displayed screen changes to the preview screen again. The other service is used in a way similar to that described before (steps S612 and S614). Here, services that conflict with the process being performed by the processing device are not selectable through an operation performed by the operator.

Figure 7:
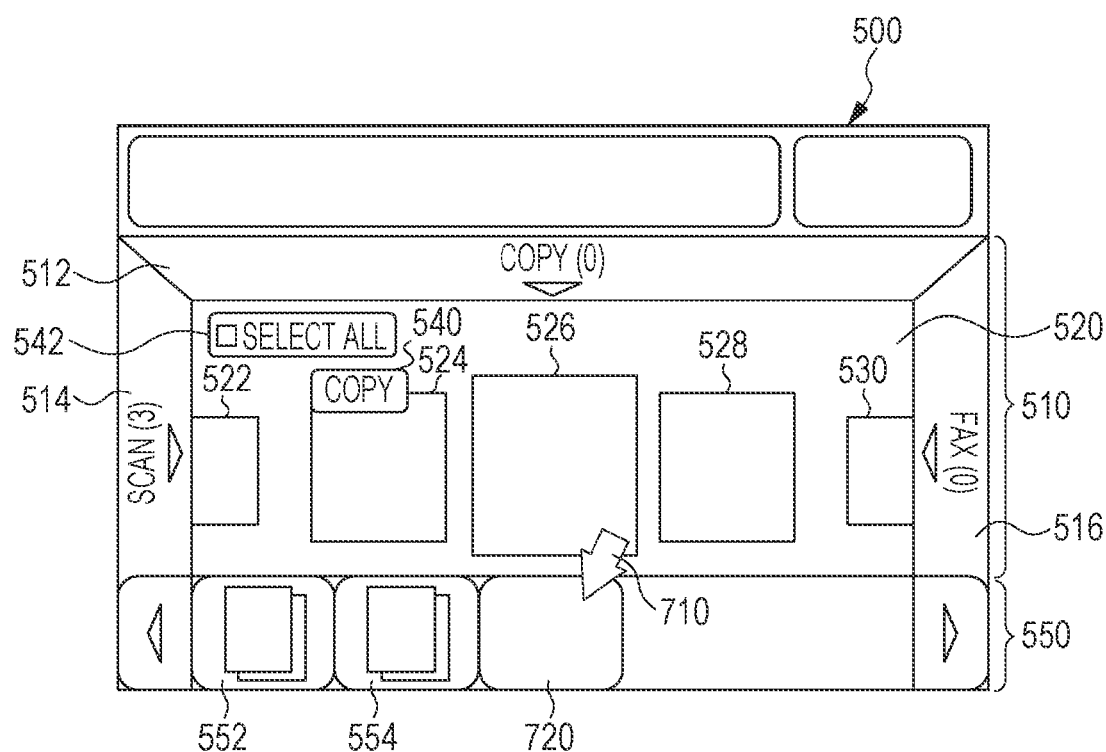
FIG. 7 illustrates an example of the displayed operation screen that is related to a document grouping process according to the exemplary embodiment.

FIG. 7 illustrates an example of the operation screen 500 that is related to a document grouping process according to the exemplary embodiment. This example describes a process of generating a document group. An operation (710) of selecting the document image 526 and then moving the document image 526 to the document group display area 550 is detected. In response to the detection, a new document group 720 is created and the document image 526 is added to the document group 720.

For example, upon the user pressing the start button after positioning multiple original documents at the ADF, reading of the original documents starts and the screen displayed on the touch panel changes to the preview screen. In the case where the user wishes to use all the read original documents in the same service, the documents may be selected one by one using the above-described method or all the documents may be grouped and used in the service by pressing of a select all specification area 542.

In the case where the user wishes to use different groups of documents, among multiple documents, in different services (for example, the copy service and the fax service), documents to be used in each service may be selected and grouped and the service may be used for each document group.

Figure 8:
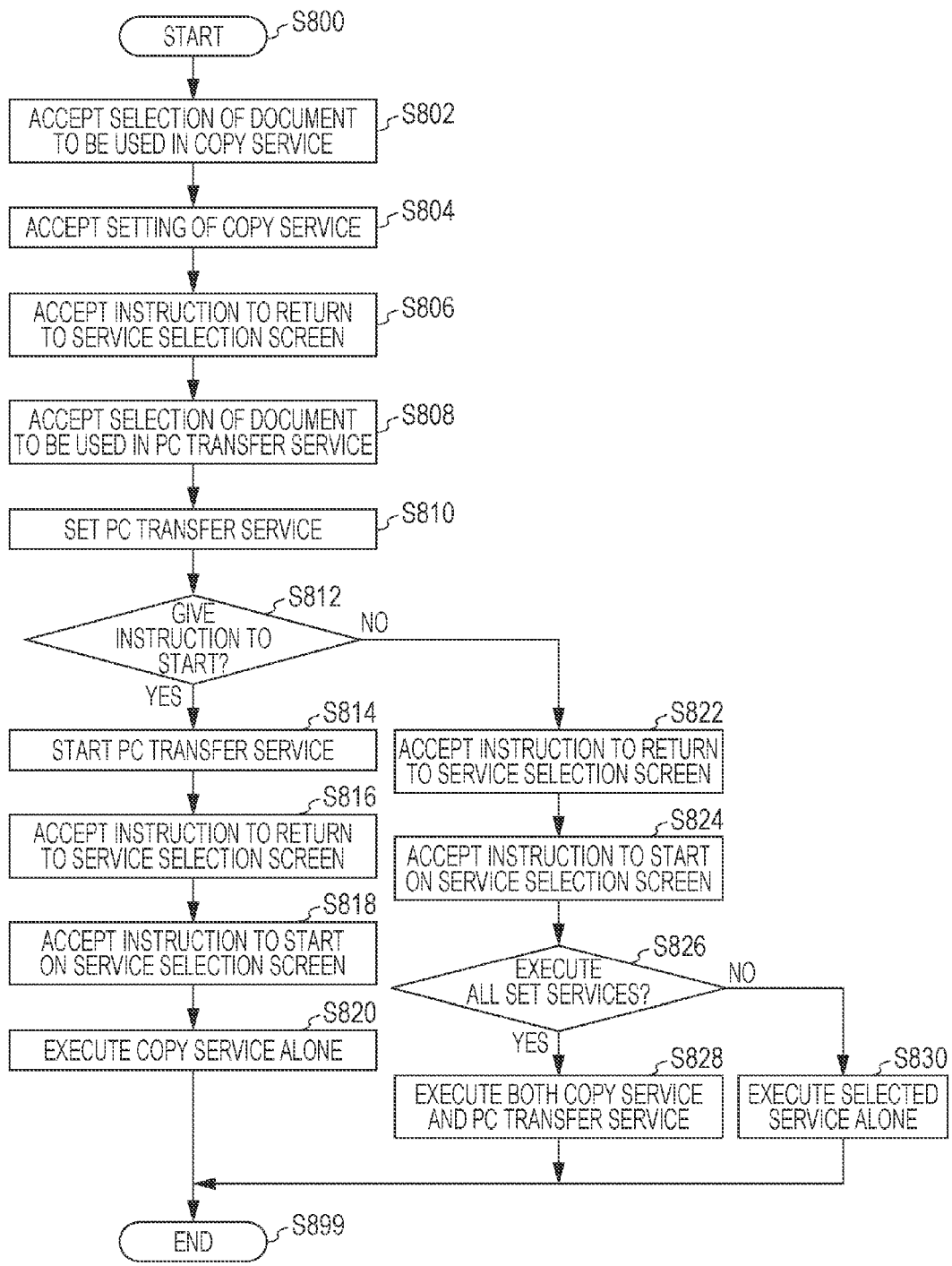
FIG. 8 is a flowchart illustrating an example of a procedure according to the exemplary embodiment.

FIG. 8 is a flowchart illustrating an example of a procedure according to the exemplary embodiment. Note that the PC transfer service is used as the second service in this example but the second service may be any other services whose process does not conflict with the process being performed by the image output device.

In step S802, the operation accepting module 120 accepts an operation of selecting a document to be used in the copy service.

In step S804, the operation accepting module 120 accepts an operation of making settings used in the copy service.

In step S806, the operation accepting module 120 accepts an instruction to return to the service selection screen.

In step S808, the operation accepting module 120 accepts an operation of selecting a document to be used in the PC transfer service.

In step S810, the operation accepting module 120 accepts an operation of making settings used in the PC transfer service.

In step S812, the determination/control module 150 determines whether or not to give an instruction to start a service. If an instruction is given, the process proceeds to step S814. Otherwise, the process proceeds to step S822.

In step S814, the PC transfer module 170 starts the PC transfer service.

In step S816, the operation accepting module 120 accepts an instruction to return to the service selection screen.

In step S818, the operation accepting module 120 accepts an instruction to start a service on the service selection screen.

In step S820, the copy module 166 executes the copy service.

In step S822, the operation accepting module 120 accepts an instruction to return to the service selection screen.

In step S824, the operation accepting module 120 accepts an instruction to start a service on the service selection screen.

In step S826, the determination/control module 150 determines whether or not to execute all set services. If all set services are to be executed, the process proceeds to step S828. Otherwise, the process proceeds to step S830.

In step S828, the copy module 166 and the PC transfer module 170 execute the copy service and the PC transfer service, respectively.

In step S830, the service processing module 160 executes the selected service.

For example, in the case where the user wishes to copy a large number of documents, a period of time needed in the case where the copy service is selected and executed from the start is shorter than that of the case where all documents are read first and the copy service is used next. This is because image reading and image outputting may be performed at the same time. Accordingly, when all documents are copied, the service may be executed after selecting all documents, which include those to be read later. For example, the user presses the start button after positioning one hundred original documents at the ADF. Thereafter, the user inputs an instruction to "select all to be read" and makes copy settings. During this period, the original documents are sequentially read. Upon the user pressing the start button again, output of images starts. This method allows the settings to be made while performing reading and thus, shortens the processing period. Also, a service (for example, PC transfer) that does not use the image output device is executable while a large number of documents are being copied. Thus, in response to an output starting instruction given after copying setting is finished, the displayed screen returns to the preview screen. If the PC transfer service is selected on the preview screen, the PC transfer process may be performed.

In the above case, the service may be started after reading of a sufficient number of original documents or all original documents ends in the case where a setting, which requires multiple images in one printing session, such as a process for printing multiple images on one sheet (for example, process called 2-up, 4-up, or the like), is made.

The user positions multiple original documents at the ADF and then presses the start button. In response to this, the displayed screen changes to the preview screen, on which the user selects a document to be used in the copy service (step S802) and makes settings if needed (step S804). If the start button is not pressed in this state, the displayed screen returns to the preview screen (step S806). Note that values set at this time are not to be changed when the copy process is performed. In this state, the user selects a document to be used in the PC transfer service (step S808) and makes settings, such as a destination address (step 810). If the start button is not pressed at this time (NO in step S812), the displayed screen returns to the preview screen again (step S822). That is, in response to detection of pressing of the start button on the preview screen after both the copy service and the PC transfer service, and images used in these services have been set (step S824), whether or not to execute both services is determined (step S826). If it is determined to execute both services (YES in step S826), the copy service and the PC transfer service are started at the same time (step S828). At this time, images to be used in the copy service and the PC transfer service may be different or may include the same image. The starting method may use, as a trigger, detection of pressing of the start button or detection of pressing of a software button, which includes the phrase "execute all currently selected services", for example. If it is determined not to execute both services (NO in step S826), a selected one of the services may be started (step S830). In response to detection of pressing of the start button on the mail transfer screen (YES in step S812), mail transfer is executed (step S814). If an instruction to return to the service selection screen is detected (step S816) and then pressing of the start button is detected (step S818), the remaining copy process is executed (step S820).

A confirmation screen is displayed in step S826 but the setting may be made so as not to display this confirmation screen.

Multiple services of a specific kind may be created. For example, suppose that the user wishes to transfer different documents, among multiple documents, to different people by email. In this case, a first address and a necessary document may be set for a first mail transfer service. The displayed screen then may return to the preview screen, on which a second address and a necessary document may be set for a second mail transfer service. This setting may be made by providing an item "create a new mail transfer service" on the mail transfer service screen. Alternatively, a new mail transfer service may be created by detecting movement of a document to the mail transfer service specification area as a result of flicking of the document with a multi-touch (with three fingers or the like).

Also, in this case, the user is allowed to select the mail transfer service to which a new document is to be added.

Figure 9:
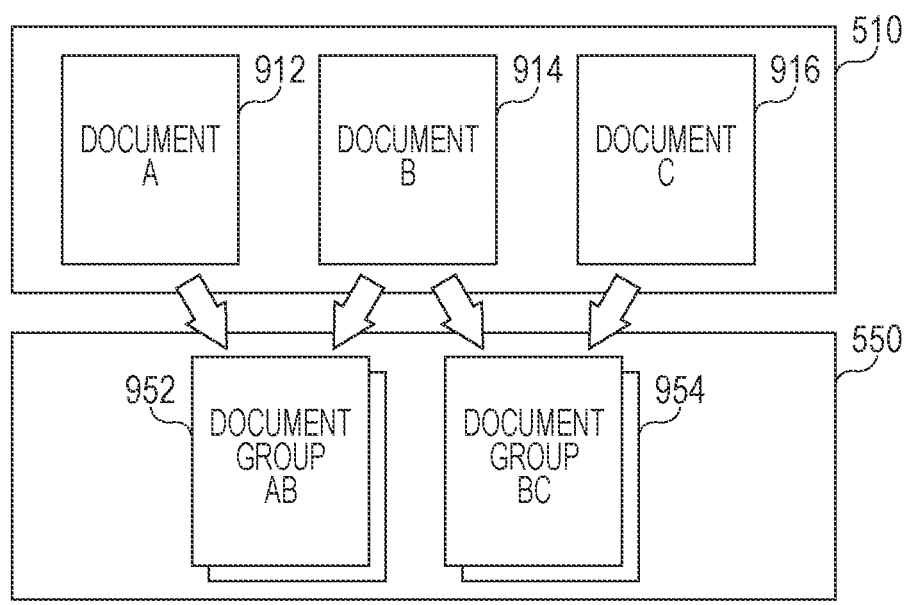
FIG. 9 illustrates an example of a relationship between an operation-preview area and a document group display area that are related to the document grouping process according to the exemplary embodiment.

FIG. 9 illustrates an example of a relationship between the operation-preview area 510 and the document group display area 550 that are related to the document grouping process according to the exemplary embodiment. The operation-preview area 510 displays a document A 912, a document B 914, and a document C 916. The document group display area 550 displays a document group AB 952 and a document group BC 954.

Suppose that the user wishes to use, in a service, a combination of the document A 912 and the document B 914 and a combination of the document B 914 and the document C 916, among the document A 912, the document B 914, and the document C 916. In general, once the document A 912 and the document B 914 are grouped, a group of the document B 914 and the document C 916 are not to be created. To avoid this, a dedicated grouping area (that is, the document group display area 550) may be prepared and used. When the document A 912 and the document B 914 are moved together to the document group display area 550, the document A 912 and the document B 914 are grouped and the document group AB 952 is created. At this time, the document A 912 and the document B 914 are left in the operation-preview area 510. When the document B 914 and the document C 916 are moved together to the document group display area 550, the document group BC 954 is created. The same service is usable for these two document groups.

As described above, because the same document is usable in multiple services, information about services in which each document has been used may be made available. This is because, without this information, the same service is possibly executed on the same document. Accordingly, a label is attached to each document so that services that have been executed (or to be executed) on the document are known and the label may be displayed. This label is not attached on a service-by-service basis but on a document-by-document basis. Thus, for example, a warning may be displayed if the user attempts to transmit the same document (or the same document group) to the same destination by fax. Alternatively, services that have been (that are to be) used may be displayed on the preview screen so as to inform the user of these services. The warning or services that have been (to be) used may be displayed constantly or temporarily when the service is selected.

Figure 10:
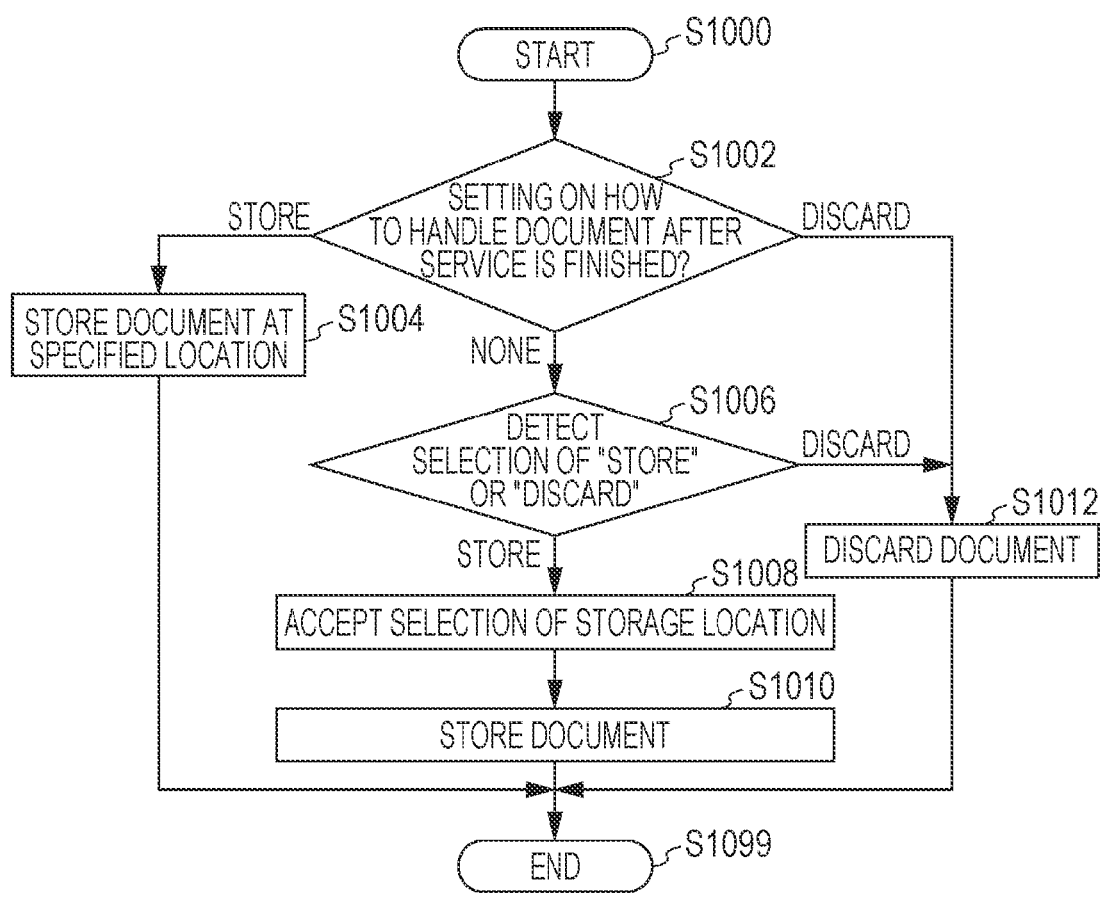
FIG. 10 is a flowchart illustrating an example of a procedure according to the exemplary embodiment.

FIG. 10 is a flowchart illustrating an example of a procedure according to the exemplary embodiment.

In step S1002, the determination/control module 150 checks a setting on how to handle a document after the service is finished. If a setting for storing the document is made, the process proceeds to step S1004. If no setting is made, the process proceeds to S1006. If a setting for discarding the document is made, the process proceeds to step S1012.

In step S1004, the image storage control module 174 stores the document at a specified location.

In step S1006, the operation accepting module 120 detects an operation of selecting storage or discard. If selection of storage is detected, the process proceeds to step S1008. If selection of discard is detected, the process proceeds to step S1012.

In step S1008, the operation accepting module 120 accepts an operation of selecting a storage location.

In step S1010, the image storage control module 174 stores the document.

In step S1012, the image storage control module 174 discards the document.

Images resulting from reading may be stored in the image storage module 180 or may be deleted. This may be decided according to a setting made in advance (step S1002) or may be decided according to an operation performed by the operator while the service is being performed or after the service has ended (step S1006). If storage is selected, the document is stored in, for example, a personal area prepared for an authenticated user.

Sometimes, the user leaves the image processing apparatus while using the service. For example, in the case of mail transfer, the user leaves the location when reading of an original document ends after a destination address or the like is set and then the start button is pressed. This is because the image processing apparatus does not require any user operation thereafter. Because the same document may be used in another service again in this exemplary embodiment, the image processing apparatus is unable to determine that all jobs have been completed even if all documents are used once. Because an operation, for example, deletion of a read document, is performed after all jobs have been completed, the image processing apparatus has to determine that the jobs have been completed using some kind of method. Some determination methods are available. For example, (1) in the case where no operation is accepted for a predetermined period, (2) in the case where authentication is cancelled (in the case where a personal authentication card necessary for using the image processing apparatus is removed from the card reader), or (3) in the case where the user explicitly indicates that the jobs have been completed, it is determined that jobs have been completed. Note that in the case where authentication is canceled, a process based on the service may be continued but the preview screen may be closed. Here, the case where the user explicitly indicates that jobs have been completed may be a case where the operation accepting module 120 detects that a software button has been pressed which includes the phrase "no next job", for example. The determination is made using any of the methods when (after) the current process has been completed, and a document temporarily stored is stored or deleted.

Figure 11:
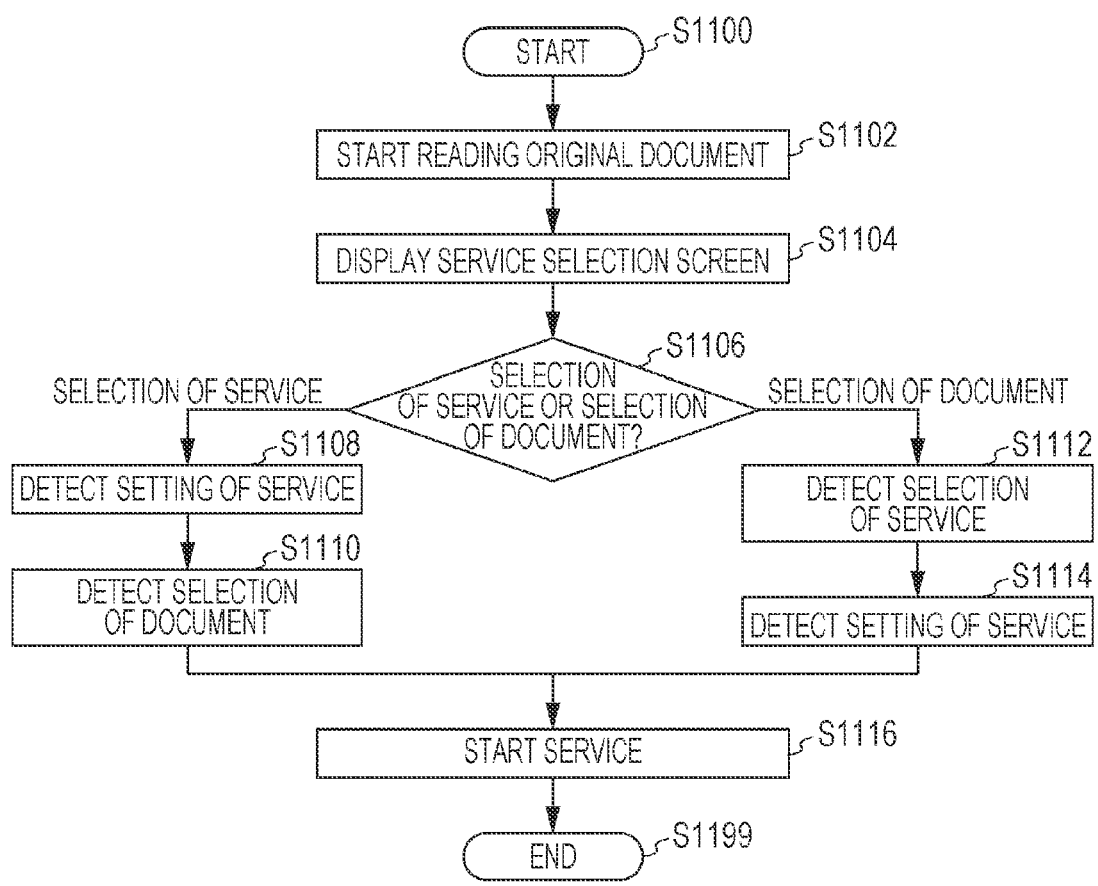
FIG. 11 is a flowchart illustrating an example of a procedure according to the exemplary embodiment.

FIG. 11 is a flowchart illustrating an example of a procedure according to the exemplary embodiment.

In step S1102, the image reading module 162 starts reading an original document.

In step S1104, the display module 110 displays the service selection screen.

In step S1106, the operation accepting module 120 determines whether an operation of selecting a service or an operation of selecting a document has been detected. If an operation of selecting a service has been detected, the process proceeds to step S1108. If an operation for selecting a document has been detected, the process proceeds to step S1112.

In step S1108, the operation accepting module 120 detects an operation of making settings of the service.

In step S1110, the operation accepting module 120 detects an operation of selecting a document.

In step S1112, the operation accepting module 120 detects an operation of selecting a service.

In step S1114, the operation accepting module 120 detects an operation of making settings of the service.

In step S1116, the service processing module 160 starts the service.

After positioning original documents at the ADF and then pressing the start button, the user may make settings on a service to be used while the original documents are being read and may then decide documents to be used in the service. Suppose that the user wishes to perform copying and email transfer on all of one hundred original documents. The user positions one hundred original documents and presses the start button (step S1102). In response to this, the preview screen is displayed (S1104). If the copy service is selected on the preview screen (selection of service in step S1106) from among services such as the copy service and the mail transfer service and selection of a document, the preview screen changes to a copy service setting screen, on which settings, such as a color/black-and-white setting and contrast adjustment, are made (step S1108). The copy service setting screen returns to the preview screen. Next, the mail transfer service is selected and mail transfer settings, such as a destination address, are made (step S1108). The service setting screen then returns to the preview screen again (step S1108). In the case where multiple services are selected, selection of a service and setting of the service are repeated. In response to detecting of pressing of the start button after "select all including those to be read" is selected (step S1110), both services are started (step S1116). Also, if a document is selected on the preview screen (selection of document in step S1106), the copy service is then selected (step S1112). In response to this, the preview screen changes to the copy service setting screen, on which settings, such as a color/black-and-white setting and contrast adjustment, are made (step S1114). The copy service setting screen then returns to the preview screen. Next, the mail transfer service is selected (step S1112), and mail transfer settings, such as a destination address, are made (step S1114). Subsequently, the copy service and the mail transfer service are performed on the selected documents (step S1116).

In the case where settings have been already made for each service, the displayed screen need not change to the setting screen again. Accordingly, a configuration is made such that, in the case where settings have been already made, documents alone are selected but a transition to the setting screen is omitted. Whether or not to cause a transition to the setting screen may be selected by the user.

Referring to FIG. 12, an example of a hardware configuration of an image processing apparatus according to this exemplary embodiment will be described. The configuration illustrated in FIG. 12 is implemented by, for example, a PC or the like. FIG. 12 illustrates an example of a hardware configuration including a data reading unit 1217, such as a scanner, and a data output unit 1218, such as a printer.

A CPU 1201 is a controller that executes processes based on a computer program that describes execution sequences of various modules described in the exemplary embodiment above, that is, the display module 110, the image display module 112, the operation accepting module 120, the setting acquisition module 130, the determination/control module 150, and the service processing module 160.

A read only memory (ROM) 1202 stores programs, computation parameters, and so forth used by the CPU 1201. A RAM 1203 stores programs used in execution performed by the CPU 1201 and parameters or the like that change accordingly during the execution. These components are connected to each other via a host bus 1204, which includes a CPU bus.

The host bus 1204 is connected to an external bus 1206, such as Peripheral Component Interconnect/Interface (PCI) bus, via a bridge 1205.

A keyboard 1208 and a pointing device 1209, such as a mouse, are input devices operated by the operator. A display 1210, such as a liquid crystal display or a cathode ray tube (CRT) display, displays various pieces of information as text information and image information.

An HDD 1211 includes a hard disk therein, drives the hard disk, and records or reads a program to be executed by the CPU 1201 or information. The hard disk stores images resulting from reading, accepted instructions, settings of individual processing modules, and so forth thereon. Furthermore, the hard disk stores various computer programs, such as other various data processing programs, thereon.

A drive 1212 reads out data or a program recorded on a mounted removable recording medium 1213, such as a magnetic disk, an optical disc, a magneto-optical disk, or a semiconductor memory, and supplies the data or program to the RAM 1203 that is connected to the drive 1212 via an interface 1207, the external bus 1206, the bridge 1205, and the host bus 1204. The removable recording medium 1213 is also usable as a data recording area just like the hard disk.

A connection port 1214 is a port to which an externally connected device 1215 is to be connected and has a connector, such as one based on Universal Serial Bus (USB) or IEEE 1394. The connection port 1214 is connected to the CPU 1201 or the like via the interface 1207, the external bus 1206, the bridge 1205, the host bus 1204, and so forth. A communication unit 1216 is connected to a communication line and executes a data communication process with external devices. The data reading unit 1217, for example, a scanner, executes a document reading process. The data output unit 1218, for example, a printer, executes a document data output process.

The hardware configuration of the image processing apparatus illustrated in FIG. 12 is merely one configuration example. In this exemplary embodiment, the hardware configuration of the image processing apparatus is not limited to the one illustrated in FIG. 12 and may be any configuration that may implement the modules described in this exemplary embodiment. For example, some of the modules may be implemented as dedicated hardware (for example, an application specific integrated circuit (ASIC)) or some of the modules may be implemented in an external system and may be connected via a communication line. Alternatively, multiple systems each illustrated in FIG. 12 may be connected to each other via a communication line so as to operate in cooperation with each other.

The described program may be provided after being stored on a recording medium or may be provided via a communication network. In such a case, for example, the described program may be regarded as the invention related to a "computer readable recording medium storing a program".

The "computer readable recording medium storing a program" is a computer readable recording medium storing a program that is used for installing and executing the program, for distribution of the program, and so forth.

Examples of the recording medium include Digital Versatile Discs (DVDs), such as "DVD-R, DVD-RW, and DVD-RAM" based on standards decided by DVD Forum and "DVD+R and DVD+RW" based on standards decided by DVD+RW; Compact Discs (CDs), such as CD-ROM, CD-recordable (CD-R), and CD-rewritable (CD-RW); Blu-ray Discs (registered trademark); magneto-optical disks (MOs); flexible disks (FDs); magnetic tapes; hard disks; ROMs; electrically erasable programmable ROMs (EEPROMs (registered trademark)); flash memories; RAMs; and secure digital (SD) memory cards.

The program or part of the program may be recorded on the recording media for storage or distribution. Also, the program or part of the program may be transmitted by communication using a transmission medium, for example, a wired network, a wireless communication network, or a combination thereof that is used in a local area network (LAN), a metropolitan area network (MAN), a wide area network (WAN), the Internet, an intranet, or an extranet; or may be propagated over carrier waves.

Moreover, the program may be part of another program or may be recorded on a recording medium together with other individual programs. Alternatively, the program may be divided and portions of the program may be recorded on plural recording media. The program may be recorded in any restorable form, such as a compressed or encrypted form.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
  a processor configured to:
    control an image reading unit to perform an image reading process on an image of a paper;
    accept, after the image reading process has started, and while the image reading process is being performed, a first operation from an operator to specify a process to be performed on the image, from among a plurality of processes;
    control an image output device to perform the specified process on the image; and
    accept, after the image reading process has started, and while the image reading process is being performed, and after the specified process has started, a second operation from the operator to specify another process to be performed on the image, from among the plurality of processes, in response to determining that the another process does not use the image output device.

2. The image processing apparatus according to claim 1, wherein the another process specified by the second operation is selected from among one or more processes that do not conflict with the process performed by the image output device.

3. The image processing apparatus according to claim 1, wherein the processor is further configured to control, in a case where the first operation specifies a first process using a first setting screen and a second process using a second setting screen and a starting instruction is accepted from the operator using the second setting screen, the image output device to perform the second process having been set using the second setting screen.

4. The image processing apparatus according to claim 1, wherein after the process performed by the image output device ends, the image subjected to the process is either stored in a memory or deleted.

5. The image processing apparatus according to claim 1, wherein the first operation from the operator is to further specify which part of the read image is to be processed.

6. The image processing apparatus according to claim 1, wherein the processor is configured to control the process and the another process to be executed during the image reading process.

7. An image processing method comprising:
  controlling an image reading process to be performed on an image of a paper;
  accepting, after the image reading process has started, and while the image reading process is being performed, a first operation from an operator to specify a process to be performed on the image, from among a plurality of processes;
  controlling the specified process to be performed on the image using an image output device; and
  accepting, after the image reading process has started, and while the image reading process is being performed, and after the specified process has started, a second operation from the operator to specify another process to be performed on the image, from among the plurality of processes, in response to determining that the another process does not use the image output device.

8. A non-transitory computer readable medium storing a program for causing a computer to execute a process for image processing, the process comprising:
  controlling an image reading process to be performed on an image of a paper;
  accepting, after the image reading process has started, and while the image reading process is being performed, a first operation from an operator to specify a process to be performed on the image, from among a plurality of processes;
  controlling the specified process to be performed on the image using an image output device; and
  accepting, after the image reading process has started, and while the image reading process is being performed, and after the specified process has started, a second operation from the operator to specify another process to be performed on the image, from among the plurality of processes, in response to determining that the another process does not use the image output device.

* * * * *